United States Patent [19]

Kuriyama

[11] Patent Number: 4,742,412

[45] Date of Patent: May 3, 1988

[54] MAGNETIC HEAD HAVING DUAL ASYMMETRIC GAPS

[76] Inventor: Toshihiro Kuriyama, 1-8-27 Shinbo, Nagaoka-shi, Niigate-ken, Japan

[21] Appl. No.: 18,927

[22] Filed: Feb. 25, 1987

[30] Foreign Application Priority Data

Jul. 2, 1986 [JP] Japan ................................. 61-156788
Aug. 22, 1986 [JP] Japan ................................. 61-197753

[51] Int. Cl.$^4$ .................. G11B 5/23; G11B 5/235; G11B 5/265
[52] U.S. Cl. ................................. 360/119; 360/120; 360/121
[58] Field of Search ............... 360/120, 119, 122, 125, 360/127, 121

[56] References Cited

U.S. PATENT DOCUMENTS

| 3,143,603 | 8/1964 | Widener | 360/120 X |
| 4,172,318 | 10/1979 | Huntt | 360/120 X |
| 4,398,229 | 8/1983 | McClure | 360/119 X |

FOREIGN PATENT DOCUMENTS

| 61-16002 | 1/1986 | Japan | 360/120 |
| 197710 | 11/1977 | U.S.S.R. | 360/120 |
| 652605 | 3/1979 | U.S.S.R. | 360/120 |

*Primary Examiner*—John H. Wolff

[57] ABSTRACT

A magnetic head including a first magnetic gap formed adjacent to one end face of magnetic cores which are spaced opposite from each other by a predetermined distance and which are made of magnetic material, said gap having a predetermined thickness and being made of nonmagnetic thin film; a magnetic thin film layer formed adjacent to the first magnetic gap and having a predetermined thickness; and a second magnetic gap formed narrow between the magnetic thin film layer and the other end face of the magnetic cores; wherein the second magnetic gap is made of Cr.

3 Claims, 3 Drawing Sheets

MAGNETIC HEAD HAVING DUAL ASYMMETRIC GAPS

BACKGROUND OF THE INVENTION (a) Field of the Invention

The present invention relates to a magnetic head and, more particularly, it relates to a magnetic head of the dual gap type having two magnetic gaps and capable of achieving high density recording.

(b) Prior Art

The magnetic head of the dual gap type is a kind of the magnetic heads of the multi-gap type and it has been used as the eraser head, for example. It has been well known in the field of magnetic recording theory that when the width of the second one of first and second magnetic gaps which the magnetic head of the dual gap type has is formed extremely narrow, or narrower than 0.1 $\mu$m, for example, the second magnetic gap loses its recording capacity only to have reproducing capacity and its reproducing capacity is largely inferior to that of the first magnetic gap because recording magnetic field at the second gap becomes too small as compared with coercive force Hc of the magnetic recording medium.

In the case of the magnetic heads of the dual gap type, the one of the metal-in-gap type in which a thin film of ferromagnetic metal is arranged between the first and second magnetic gaps is available as the magnetic head for 8 mm VTR, for example. In the case of the magnetic head of this metal-in-gap type, azimuth loss is used, inclining the second magnetic gap relative to the first one, so as to remove false signal caused by the second magnetic gap. This false signal has been deemed as being harmful and unnecessary.

When high density recording is to be effected in digital magnetic recording, there is caused peak shift wherein the peak position of reproducing signal waveforms is shifted from the inverted space position of recording current for recording signals on the magnetic recording medium. This peak shift phenomenon is caused when a reproduced signal waveform is interfered with its adjacent signal waveforms, and when the peak position of reproduced signal waveforms is shifted because of this peak shift phenomenon, there is the possibility that the reproduced signal waveforms come out of the detecting window for synchro signals. As the result, they cannot read as correct information but error in this case, thereby disturbing high density recording.

SUMMARY OF THE INVENTION

The present invention is therefore intended to eliminate the above-mentioned drawback and the object of the present invention is to provide a magnetic head of the dual gap type wherein magnetic gaps are arranged to achieve high density recording, effectively using false signals caused by the second magnetic gap made of Cr.

The magnetic head of the present invention comprises a first magnetic gap formed with a predetermined thickness and adjacent to one end face of magnetic cores and made of nonmagnetic thin film, said magnetic cores being separated from each other with a predetermined distance interposed between them and made of magnetic material; a magnetic thin film formed with a predetermined thickness and adjacent to the first magnetic gap; and a second magnetic gap formed narrow between the magnetic thin film and the other end face of the magnetic cores and made of Cr.

According to the magnetic head of the present invention, the distance between centers of the first and second magnetic gaps which are formed between the opposite end faces of the magnetic cores with a layer of magnetic thin film interposed between the gaps is made larger than the minimum recording or magnetic inversion space for the minimum information units to be recorded on the recording medium but smaller than two times the space. When signals reproduced by the second magnetic gap which has this distance relation and is made of Cr is used, the peak shift caused by the interference of adjacent waveforms can be improved.

DETAILED DESCRIPTION OF THE PREFERRED EMBODIMENT

The present invention will be described with reference to the drawings.

Figure 1:
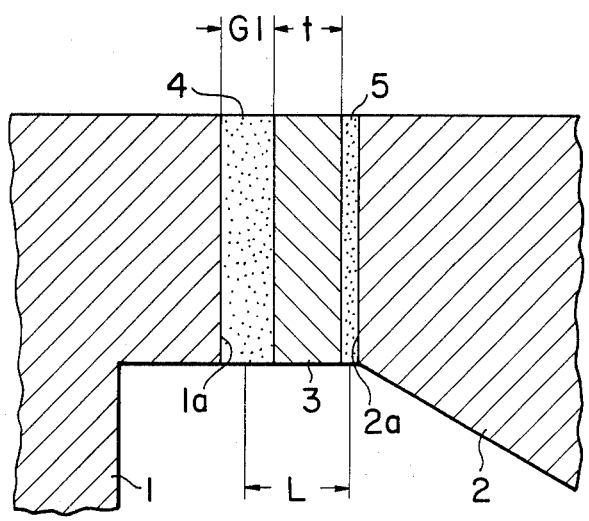
FIG. 1 is an enlarged sectional view showing magnetic gaps of a magnetic head according to the present invention.

FIG. 1 is an enlarged sectional view showing the magnetic gap portion of a magnetic head according to the present invention. This magnetic head is used with the magnetic disk, for example, as its magnetic recording medium and it is intended to record and reproduce digital information at high density in relation to the magnetic disk.

The magnetic head is of the metal-in-gap type wherein first and second magnetic gaps 4 and 5 are formed between opposite end faces 1a and 2a of paired magnetic cores 1 and 2, sandwiching a layer 3 of magnetic metal thin film between the gaps, said cores being made of MnZn and NiZn which are ferromagnetic oxides and said magnetic metal thin film layer being made of alloys of Fe-Al-Si system, permalloy, amorphous metal or the like. The first magnetic gap 4 is formed wide between the end face 1a of the magnetic core 1 and the magnetic metal thin film layer 3 and made of SiO$_2$, glass or the like, while the second magnetic gap 5 is formed extremely thin between the end face 2a of the magnetic core 2 and the magnetic metal thin film layer 3 and made of Cr. The second magnetic gap 5 is made extremely thin, ranging 200–500Å.

The magnetic metal thin film layer 3 is formed on the magnetic gap 5 by sputtering or evaporating, after the second magnetic gap 5 is formed on the second magnetic core 2.

Cr of which the second magnetic gap 5 is made is usually called activation metal and Ti as well. The activation metal is likely to be oxidized. On the other hand, Mn-Zn and Ni-Zn of which the second magnetic core 2 is made are ferromagnetic metal oxides. Therefore, the second magnetic core and gap 2 and 5 are likely to closely contact each other.

Cr of which the second magnetic gap 5 is made and metal such as alloy of Fe-Al-Si system of which the magnetic metal thin film layer 3 is made are also likely to closely contact each other because they are metals. Although metal and oxide make it difficult to set their sputtering or evaporating conditions, Cr of which the second magnetic gap 5 is made is used as the base layer for the magnetic metal thin film layer 3 when the layer 3 is to be formed. As mentioned above, the second magnetic gap 5 and the magnetic metal thin film layer 3 are likely to closely contact each other, thereby making it easy to set their sputtering or evaporating conditions.

As described above, the magnetic head is used to record and reproduce digital information relative to the magnetic disk and when the information is recorded on the disk, the shortest distance between adjacent information units recorded is one the innermost circumference of the magnetic disk. More specifically, when bit informations or bit informations [1] and [1], for example, which are the smallest information units are recorded adjacent to each other, the distance between 1-bit and 1-bit thus recorded adjacent to each other is the shortest on the innermost circumference of the magnetic disk. Recording density is therefore the highest on this innermost circumference of the magnetic disk. When information is recorded at high density by means of the magnetic head, therefore, attention must be paid to this innermost circumference of the magnetic disk. When the magnetic head is arranged to effect recording and reproducing with sharp resolution even on the innermost circumference of the magnetic disk, high density recording and reproduction can be achieved with reliability.

Assuming therefore that the distance between the smallest units of bit information recorded adjacent to each other on the innermost circumference of the magnetic disk where recording density is the highest, or the smallest magnetic inversion space at which information is recorded on the magnetic recording medium is b, the distance between centers of the first and second magnetic gaps 4 and 5 is L, as shown in FIG. 1, and thicknesses of the first magnetic gap 4 and the magnetic metal thin film layer 3 are Gl and t, the magnetic head is formed to meet the following formula:

$$b < L < 2b \quad (1)$$

The thickness of the second magnetic gap 5 is extremely thin and when it is imagined that a nonmagnetic area which corresponds to the second magnetic gap is formed at the boundary between the end face 2a of the magnetic core 2 and the magnetic metal thin film layer 3 because they are different in magnetic property, the second magnetic gap can be made unnecessary. The above-mentioned formula can be therefore changed as follows, neglecting the thickness of the second magnetic gap 5:

$$b < Gl/2 + t < 2b \quad (2)$$

Figure 2A:
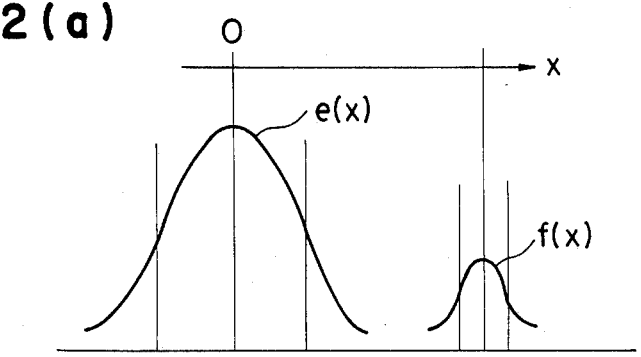
FIGS. 2(a) and 2(b) are intended to explain the magnetic head shown in FIG. 1.
Figure 2B:
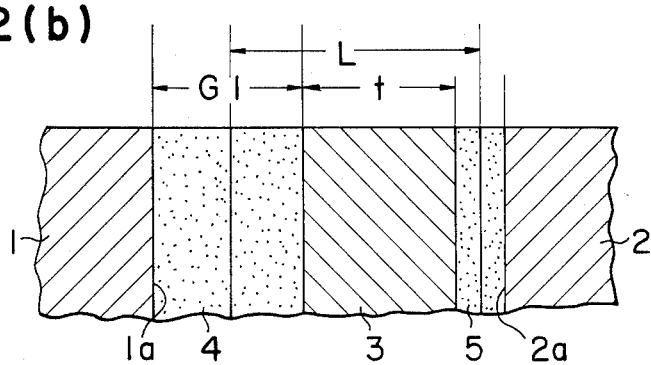

To explain in more detail, it is assumed that signal e(x) having a reproduced waveform shown in FIG. 2(a) is obtained from the first magnetic gap 4 and that signal f(x) having a reproduced waveform shown in FIG. 2(b) is obtained from the second magnetic gap 5, when same signal recorded on the magnetic recording medium is reproduced by means of the magnetic head having such dual gaps as shown in FIGS. 1 and 2(b). In this case, reproduced signal f(x) is delayed from reproduced signal e(x) only by phase difference δ which corresponds to the distance L between the centers of the first and second magnetic gaps 4 and 5. It is smaller in amplitude and it can be formulated approximately as follows:

$$f(x) = ke(x - \delta) \quad (3)$$

wherein $0 < k < 1$. The phase difference corresponds to the distance L between the centers of the first and second magnetic gaps and approximately, $L \approx Gl/2 + t$, as mentioned above. The functional form of actual waveform e(x) which corresponds to the one at the recording current inversion time can be derived from the magnetic recording theory or the like.

When the magnetic gaps 4 and 5 are spaced from each other in such a way that signal f(x) reproduced by the second magnetic gap 5 is delayed in phase from signal e(x) reproduced from the first magnetic gap 4 only by δ or the distance Gl/2+t between the gaps 4 and 5, and when signal e(x) reproduced by the first magnetic gap 4 is compensated by signal f(x) reproduced by the second magnetic gap 5, the peak shift phenomenon can be improved. This can be achieved when the distance between the magnetic gaps 4 and 5 of the dual gap type magnetic head is set relative to the smallest magnetic inversion space b, as shown by the abovementioned formulas (1) and (2).

Figure 3:
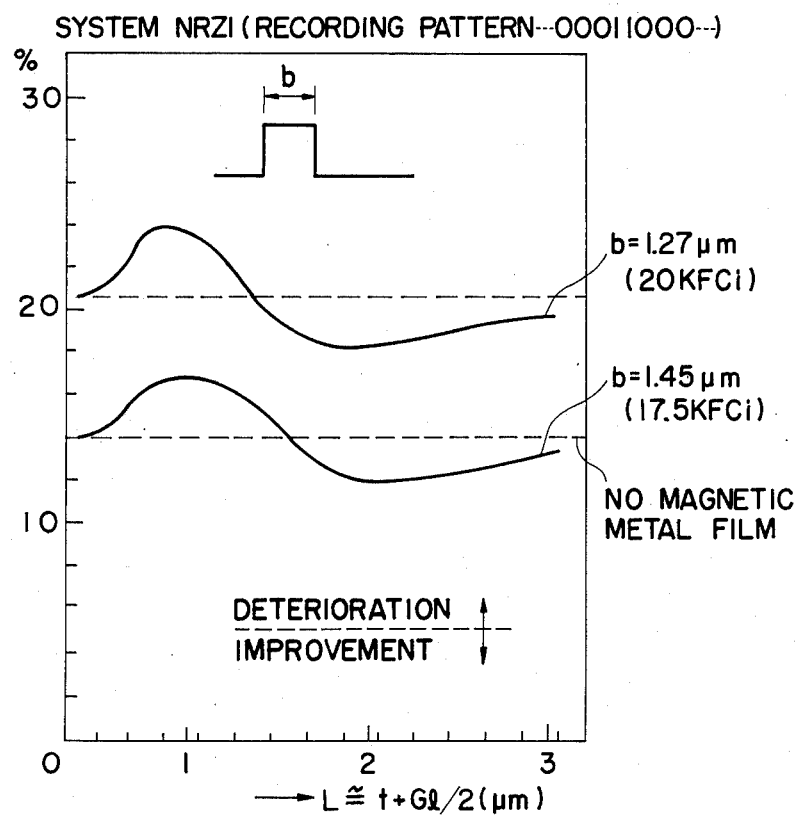
FIG. 3 is a graph showing an example of calculated results of peak shifts in NRZI recording modulation system of the magnetic head shown in FIG. 1.
Figure 4:
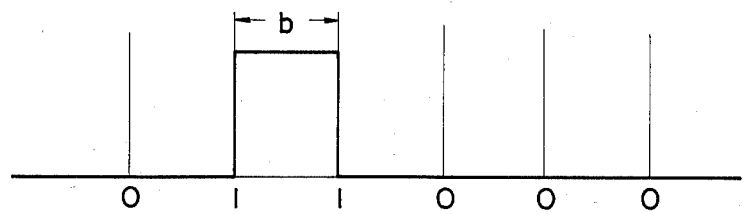
FIG. 4 shows a recording pattern in NRZI recording modulation system.

Peak shifts calculated in the case of the magnetic head formed as described above will be described referring to FIG. 3. FIG. 3 is a graph showing peak shift characteristics in a case where NRZI (Non Return to Zero Inversion) recording system is employed as the information recording modulation system. The distance $L \approx Gl/2 + t$ between the magnetic gaps 4 and 5 is plotted on the axis of abscissas while peak shift improvement in percentage is on the axis of coordinates, taking the smallest magnetic inversion space b as a parameter. The worst recording pattern has been well known to be |———00011000———| in the case of NRZI recording system, and this recording pattern becomes a recording current waveform as shown in FIG. 4 wherein the distance between adjacent 1-bit and 1-bit is the smallest magnetic inversion space b. Peak shifts calculated from the relation between the distance L=Gl/2+t and the smallest magnetic inversion space b in this pattern are shown in FIG. 3.

Peak shifts are shown in FIG. 3, relating to two parameters of b=1.25 μm (20kFCi) and b=1.45 μm (17.5kFCi). Their characteristics obtained when the magnetic gap is single without any magnetic metal thin film layer are shown in broken straight lines, while peak shifts relative to the smallest magnetic inversion space b in the case of the magnetic head shown in FIG. 1 are shown in solid lines. When the solid line is above the broken line, the peak shift is deteriorated but when it is below the broken line, the peak shift is improved. When FIG. 3 is seen from this viewpoint, it can be understood that the peak shift is better improved at an area where the distance $L \approx Gl/2 + t$ is larger than the smallest magnetic inversion space b, or at an area of Gl/2+t>b, as compared with the single magnetic gap head, and that this improvement effect is more remarkable particularly at an area of b<Gl/2+t<2b.

Figure 5:
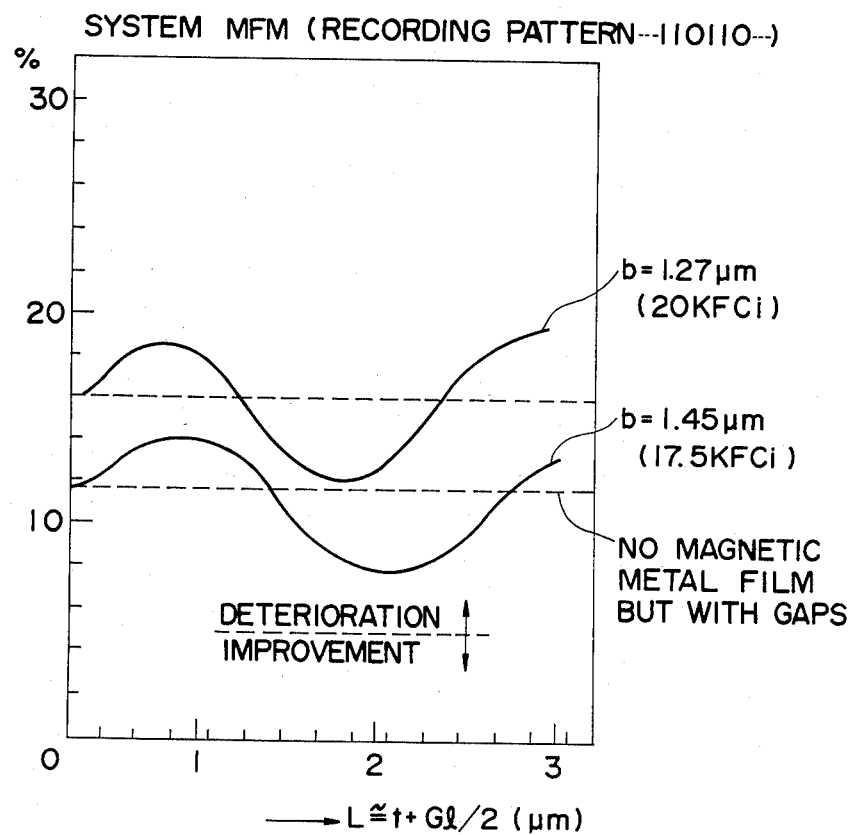
FIG. 5 is a graph showing an example of calculated results of peak shifts in MFM recording modulation system of the magnetic head shown in FIG. 1.

FIG. 5 is also a graph showing peak shifts calculated taking same parameters as those in FIG. 3 in a case where MFM (Modified Frequency Modulation) recording system is used as the recording modulation system. The worst recording pattern is |——01101-10——| in the case of MFM recording system and when FIG. 5 is viewed relating to this pattern, it can be understood that the peak shift is improved at an area where the distance $L \approx Gl/2 + t$ is larger than the smallest magnetic inversion space b but smaller than two times the space b, or at an area of $b < Gl/2 + t < 2b$.

RLL recording modulation system and others are available as well and peak shifts calculated in same way are as follows: Assuming that the minimum magnetic inversion space b is represented by Tmin and the maximum magnetic inversion space by Tmax in a recording modulation system, the worst peak shift pattern is of continuous one in which Tmin and Tmax appear alternately. When the distance ($L \approx Gl/2 + t$) is $$Tmin\ (=b) < Gl/2 + t < (2Tmin + Tmax)/2 \qquad (4),$$

therefore, the peak shift is improved and this improvement effect is remarkable particularly when $$Tmin\ (=b) < Gl/2 + t < 2Tmin\ (=2b) \qquad (2)'$$

even if Tmax is larger than 2 Tmin. When MFM recording modulation system is employed, the formula (4) becomes same as the formula (2) or (2)' because Tmax=2 Tmin.

When the magnetic gaps of the magnetic head are formed to meet the above-mentioned relation or relation represented by the formulas (1) and (2), signals detected and reproduced by the second magnetic gap 5 and conventionally removed as being unnecessary can be used to improve the peak shift.

As described a little in relation to the formula (2), the second magnetic gap 5 is extremely thin. In addition, it is imagined that an effective magnetic gap caused from difference in magnetic property or nonmagnetic area which corresponds to the second magnetic gap and which is caused by diffusion and chemical action between two magnetic materials is formed, several tens or hundreds Å thick, at the boundary between the end face 2a of the magnetic core 2 and the magnetic metal thin film layer 3, and that this acts as the second magnetic gap. The second magnetic gap 5 can be thus omitted.

According to the present invention as described above, the distance between centers of first and second magnetic gaps which are formed between opposite end faces of magnetic cores with a magnetic thin film layer interposed between the gaps is made larger than the minimum recording space at which the minimum information units are recorded on a magnetic recording medium but smaller than two times the minimum recording space. When the magnetic head is constructed like this, peak shift caused by interference between adjacent signal waveforms can be improved by signals reproduced by the second magnetic gap which is made of Cr, thereby enabling high density recording to be achieved.

What is claimed is:

1. A magnetic head having a pair of opposing magnetic end cores and dual gaps formed between the end cores on one surface of the magnetic head facing a recording medium, for recording and reproducing information units spaced on the recording medium by at least a minimum spacing Tmin, comprising:
   a first magnetic gap formed adjacent one of the magnetic end cores having a predetermined thickness of Gl and being made of a nonmagnetic thin film;
   a second magnetic gap formed adjacent the other of the magnetic end cores having a thickness which is substantially narrower and dimensionally negligible compared to the first gap; and
   a magnetic thin film layer formed between the first and second magnetic gaps having a predetermined thickness t,
   wherein a distance L between centers of the first and second magnetic gap is defined approximately as:

$$L \approx Gl/2 + t,$$

and the thickness Gl of the first magnetic gap and the thickness t of the magnetic thin film layer are selected such that the distance L is larger than Tmin and less than $2 \times Tmin$, in order to provide an improved peak shift characteristic for the given minimum spacing Tmin of the information units.

2. A magnetic head according to claim 1, wherein the second magnetic gap is made of a layer of Cr.

3. A magnetic head according to claim 1 wherein the magnetic cores are made of ferromagnetic oxide and the magnetic thin film layer is made of magnetic metal thin film.

* * * * *

UNITED STATES PATENT AND TRADEMARK OFFICE
CERTIFICATE OF CORRECTION

PATENT NO. : 4,742,412

DATED : May 3, 1988

INVENTOR(S) : Toshihiro Kuriyama

It is certified that error appears in the above-identified patent and that said Letters Patent is hereby corrected as shown below:

On the Title Page, insert the Assignee, --ALPS ELECTRIC CO., LTD., Japan--.

Signed and Sealed this

Nineteenth Day of September, 1989

Attest:

DONALD J. QUIGG

Attesting Officer

Commissioner of Patents and Trademarks